A. CHRISTIANSON.
LONG SPRING BASE FOR TRUCKS.
APPLICATION FILED OCT. 22, 1912.
1,092,824.
Patented Apr. 14, 1914.
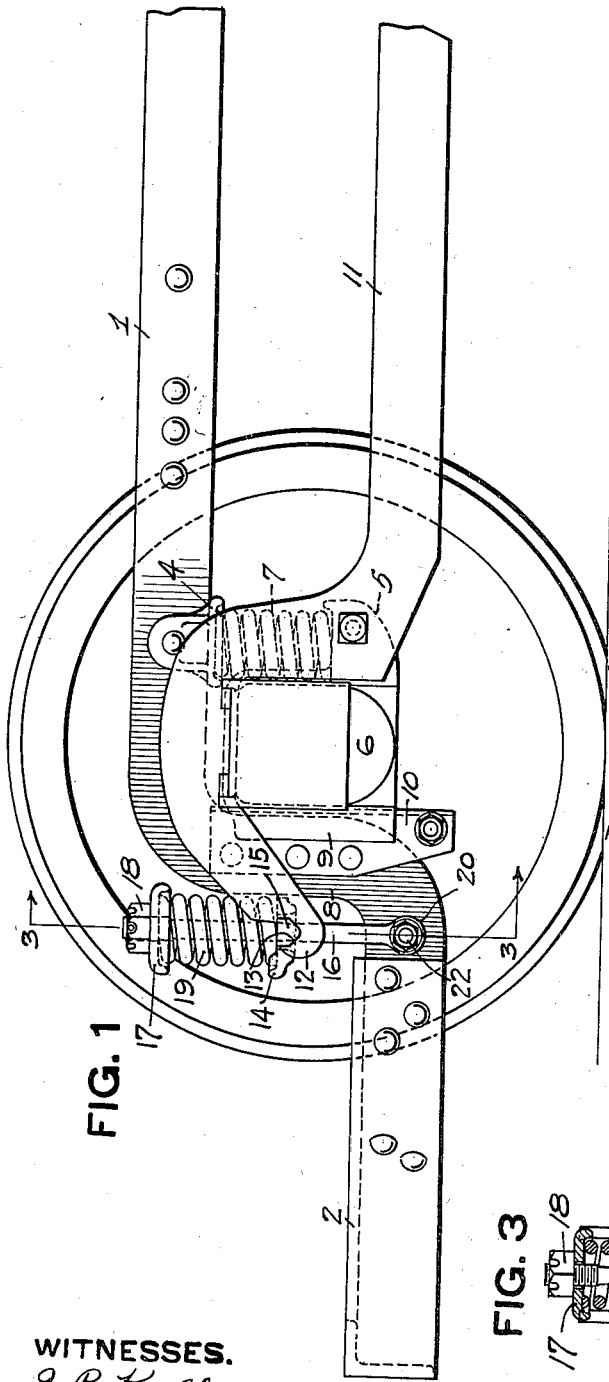
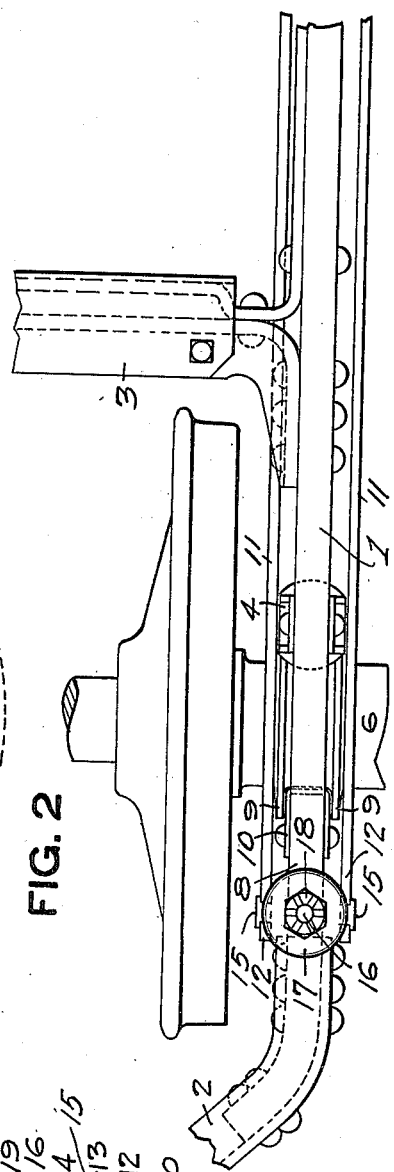
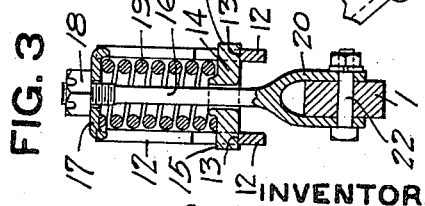
WITNESSES.
INVENTOR.

UNITED STATES PATENT OFFICE.

ANDREW CHRISTIANSON, OF BUTLER, PENNSYLVANIA, ASSIGNOR TO STANDARD MOTOR TRUCK CO., OF PITTSBURGH, PENNSYLVANIA, A CORPORATION OF PENNSYLVANIA.

LONG SPRING-BASE FOR TRUCKS.

1,092,824.  Specification of Letters Patent.  Patented Apr. 14, 1914.

Application filed October 22, 1912. Serial No. 727,268.

*To all whom it may concern:*

Be it known that I, ANDREW CHRISTIANSON, a citizen of the United States, and resident of Butler, in the county of Butler and State of Pennsylvania, have invented a new and useful Improvement in Long Spring-Bases for Trucks; and I do hereby declare the following to be a full, clear, and exact description thereof.

My invention relates to car trucks, and is particularly concerned with an improved construction and arrangement of the spring mounting of the truck frame upon the wheels of the truck.

The invention has for its object the provision of a long spring base for the truck frame, that is to say, an arrangement whereby the frame has an extended spring bearing longitudinally of the wheel base, so that excessive rocking of the truck frame will be prevented. Furthermore, the invention has the advantage that the bearing pressure of the truck frame is distributed substantially equally on both sides of the journal bearing. Furthermore the extra spring means are so arranged as to be entirely out of the way of the brake gear and of the bolster support. Again the improved spring construction and arrangement may be effected with but very slight change in the construction of the equalizer bars, and with absolutely no change in the construction of standard truck frames.

With these objects and advantages in view the invention consists in a construction and arrangement of parts a preferred embodiment of which is illustrated in the accompanying drawings in which—

Figure 1 is a fragmentary view in side elevation of a car truck embodying the invention. Fig. 2 is a plan view of the part shown in Fig. 1; and Fig. 3 is a sectional view on the line 3—3 Fig. 1 looking to the right.

In the embodiment of the invention herein selected for illustration, 1 indicates one of the side frames of a truck frame of usual construction and 2 one of the end frames of the truck frame. This frame is reinforced in the usual manner by transoms such as 3. The truck frame is provided with the usual spring seat members 4 between which and the corresponding spring seat lug 5 on the journal box 6 may be interposed a spring 7. The downwardly extending portion 8 of the truck frame which ordinarily rides in a saddle 9 at the forward side of the journal box is provided with the usual wear plate 10. As thus far described the truck is and may be of usual construction.

Instead of the ordinary form of equalizer bars usually employed, I provide said bars 11 with forward extensions 12 which are preferably inclined somewhat downwardly beyond the journal box and are provided with any suitable form of seat 13 to receive a spring bearing member 14. As here shown this seat 13 is of angular form and the lug 15 of the spring bearing member is likewise of angular form, so that the one may have a more or less rocking bearing upon the other to compensate for any slight movement of the truck frame relatively to the equalizer bars. Through the spring bearing member 14 passes a hanger bolt or rod 16 having at its upper end the complemental spring bearing member 17 held in place by a lock nut 18 and between these bearing members 14 and 17 is interposed a second spring 19. The lower end of the hanger bolt may be bifurcated as at 20, Fig. 3, to straddle the forward extension of the drop portion of the side frame to which it is secured by a bolt 22. With this construction the truck frame has its spring bearing considerably extended relatively to the wheel base, and moreover inasmuch as the spring supports 7 and 19 are situated on opposite sides of the journal box the bearing pressure is substantially equally distributed on both sides of the journal box since the forward extension of the equalizer bar has a bearing throughout the width of the top of the journal box. By placing extra springs of this character out beyond the journal boxes and axle, the central portion of the truck is left entirely clear for the reception of the brake gear, and the bolster and its mountings. Furthermore this extended spring base is secured without in any way extending the wheel base which in motor trucks particularly is of special advantage.

While I have herein described a particular embodiment of my invention, it is to be understood that the same may be altered in details and arrangements of parts within the scope of the appended claims.

What I claim is:

1. In a car truck comprising a truck frame, equalizer bars and a journal box, a spring connection suspended from said bar and connected to said frame at the outer side of the journal box.

2. In a car truck comprising a truck frame, an equalizer bar and journal box, of spring supports for said truck frame at the inner side of said journal box, and a spring support for said frame suspended from said equalizer bars at the outer side of the journal box.

3. In a car truck comprising a truck frame, a journal box and equalizer bars having an extension beyond said journal box, of a spring support by which the truck frame is suspended from said extension.

4. In a car truck comprising a truck frame, equalizer bars and a journal box, of a hanger connected to an extension of the truck frame beyond the journal box and having a spring connection with the equalizer bars.

5. In a car truck comprising a truck frame, equalizer bars and a journal box, said equalizer bar having an extension at the outer side of the journal box, a spring seat on said extension and hanger attached to said truck frame, and a spring member interposed between said hanger and said spring seat.

6. In a car truck comprising a truck frame, hanger bars and a journal box, said truck frame having a drop extension at the outer side of the journal box, said hanger bars also having an extension at the outer side of the journal box located above the drop extension of the frame, a spring member resting upon said extension of the equalizer bars, and having a hanger connection with the drop extension of the truck frame.

In testimony whereof, I the said ANDREW CHRISTIANSON have hereunto set my hand.

ANDREW CHRISTIANSON.

Witnesses:
ROBERT C. TOTTEN,
JOHN F. WILL.